United States Patent
Taylor et al.

(10) Patent No.: US 8,078,911 B2
(45) Date of Patent: Dec. 13, 2011

(54) ERROR RECOVERY FOR APPLICATION-LEVEL INTERMEDIARIES

(75) Inventors: John Anthony Taylor, Bellevue, WA (US); Nicholas Alexander Allen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 131 days.

(21) Appl. No.: 12/580,942

(22) Filed: Oct. 16, 2009

(65) Prior Publication Data

US 2011/0093738 A1 Apr. 21, 2011

(51) Int. Cl.
*G06F 11/00* (2006.01)
(52) U.S. Cl. ........... 714/18; 714/4.1; 714/16; 714/43
(58) Field of Classification Search ............ 714/4.1, 714/15, 16, 18, 43
See application file for complete search history.

(56) References Cited

U.S. PATENT DOCUMENTS

| | | | |
|---|---|---|---|
| 6,397,352 B1* | 5/2002 | Chandrasekaran et al. | 714/16 |
| 6,961,865 B1* | 11/2005 | Ganesh et al. | 714/2 |
| 2003/0074413 A1* | 4/2003 | Nielsen et al. | 709/206 |
| 2003/0233595 A1* | 12/2003 | Charny et al. | 714/4 |
| 2004/0240444 A1* | 12/2004 | Matthews et al. | 370/389 |
| 2010/0318654 A1* | 12/2010 | Paramasivam et al. | 709/225 |

* cited by examiner

*Primary Examiner* — Robert Beausoliel, Jr.
*Assistant Examiner* — Joseph D Manoskey
(74) *Attorney, Agent, or Firm* — Workman Nydegger (57) ABSTRACT

Error handling in the intermediation of one-way transacted messages. Rather than receiving an inbound message under a transaction, the intermediary performs a non-destructive exclusive read of the message from the source outside of a transaction. Routing logic is applied against the content of the message to determine a collection of message consumers to which a copy of the inbound message is to be sent. Then, under a transaction, the copy of the message is attempted to be sent to each destination. If a send of the copy fails, the transaction is rolled back, but the failure is recorded such that the same transmission mechanism is not, or is less likely to be, tried again in subsequent attempts. The principles may apply to a single message to be sent under the transaction, or to multiple messages to be sent under a single transaction.

19 Claims, 4 Drawing Sheets

Figure 4 ations.

ERROR RECOVERY FOR APPLICATION-LEVEL INTERMEDIARIES

BACKGROUND

A common pattern in messaging middleware is that of the intermediary. The intermediary is a service that is communicatively situated between two messaging communication mediums and transfers application-level messages between them. As the term is used herein, "messages" means application-level messages unless otherwise noted. The application-level message is a message that may be consumed by an application at the application-level in the protocol stack.

The communication mediums that will be described further herein are one-way transacted message infrastructures such as a typical queue that queues messages. Sometimes, the messaging intermediary is augmented with routing functionality to form a routing intermediary service. In this case an inbound message may be examined by the routing intermediary service, and a collection of outbound destinations for the message is identified based on routing logic. The routing intermediary service then sends a copy of the inbound message it has received to each outbound destination in the identified collection, thereby enabling multicast routing functionality.

Conventional routing intermediary services may route message transactionally using a two-phase commit transaction. For each message, the intermediary creates a transaction, and then receives the inbound message under the transaction. Then, routing logic is applied against the content of the message that results in the identification of a collection of message consumers to be sent a copy of the message. A copy of the message is then sent under the transaction to each of the message consumers in the collection. If all messages are successfully sent, the transaction is committed.

If, however, an error occurs during the transaction, the transaction rolls back. However, the rollback will restore the state of the inbound message source. Furthermore, the intermediary has no state that recognizes that an attempt to dispatch the message has already been attempted. Accordingly, the intermediary would perhaps repeat the whole process all over again in a never ending sequence, since the same failure that was encountered during the first attempt might persist across many attempts.

BRIEF SUMMARY

Embodiments described herein related to error handling in the intermediation of one-way transacted messages. Rather than receiving an inbound message under a transaction, the intermediary performs a non-destructive exclusive read of the message from the source outside of a transaction. Routing logic is applied against the content of the message to determine a collection of message consumers to which a copy of the inbound message is to be sent. Then, under a transaction, the copy of the message is attempted to be sent to each destination. For each destination, the intermediary checks a record of previous send attempts to send that message to that destination. If the record indicates that there are one or more other unsuccessful attempts to send that message to the corresponding destination, the intermediary tries an alternative transmission channel. The alternative transmission channel might be a different mechanism to send the message to the same destination, and/or might transmit the message to an alternative destination. The first time the intermediary attempts to send the message to the destination, however, the record will show no previous send attempts. Thus, in that case, the intermediary would attempt some primary transmission channel to communicate the message to the corresponding destination. If the current attempt to send that message to the destination fails, that failure is recorded for subsequent use in future transactions, and the transaction is rolled back.

Thus, even if the inbound message is not successfully sent to all destinations in the first transaction, each subsequent transaction provides another chance to dispatch the message. Thus, with a certain number of repeated transactions, the intermediary learns that another way of transmitting the message is to be attempted, until a successful mechanism is found for all destinations or their alternates.

These general principles may be applied to one message being sent under a single transaction, or even to multiple messages that are to be sent under a single transaction as part of a session. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, error handling in the intermediation of one-way transacted messages is described. Rather than receiving an inbound message under a transaction, the intermediary performs a non-destructive exclusive read of the message from the source outside of a transaction. Routing logic is applied against the content of the message to determine a collection of message consumers to which a copy of the inbound message is to be sent. Then, under a transaction, the copy of the message is attempted to be sent to each destination. If a send of the copy fails, the transaction is rolled back, but the failure is recorded such that the same transmission mechanism is not, or is less likely to be, tried again in subsequent attempts. The principles may apply to a single message to be sent under the transaction, or to multiple messages to be sent under a single transaction.

First, some introductory discussion regarding computing systems will be described with respect to FIG. 1. Then, various embodiments of a mechanism for error handling in the intermediation of transacted messages will be described with respect to FIGS. 2 through 4.

Figure 1:
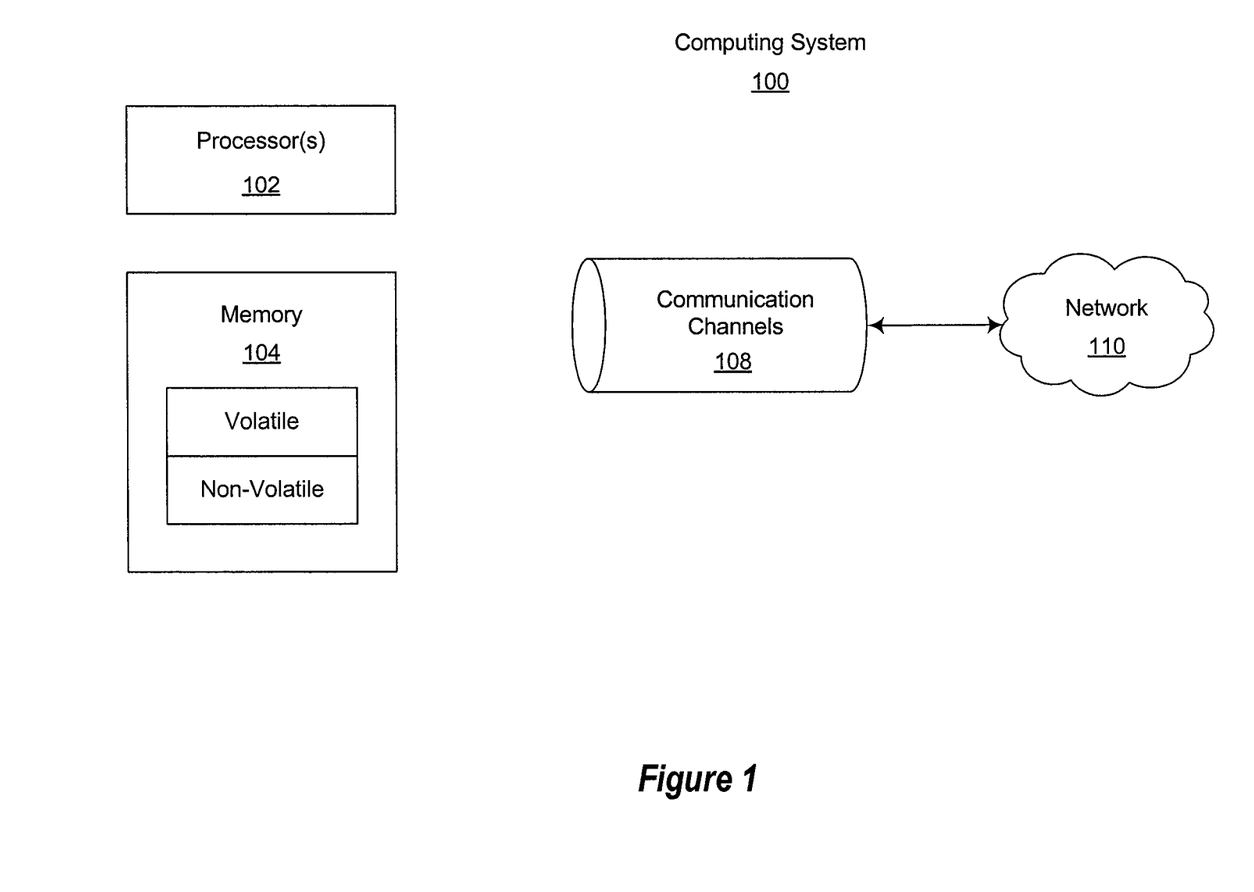
FIG. 1 illustrates an example computing system that may be used to employ embodiments described herein.

First, introductory discussion regarding computing systems is described with respect to FIG. 1. FIG. 1 illustrates a computing system, which may implement a message processor in software. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
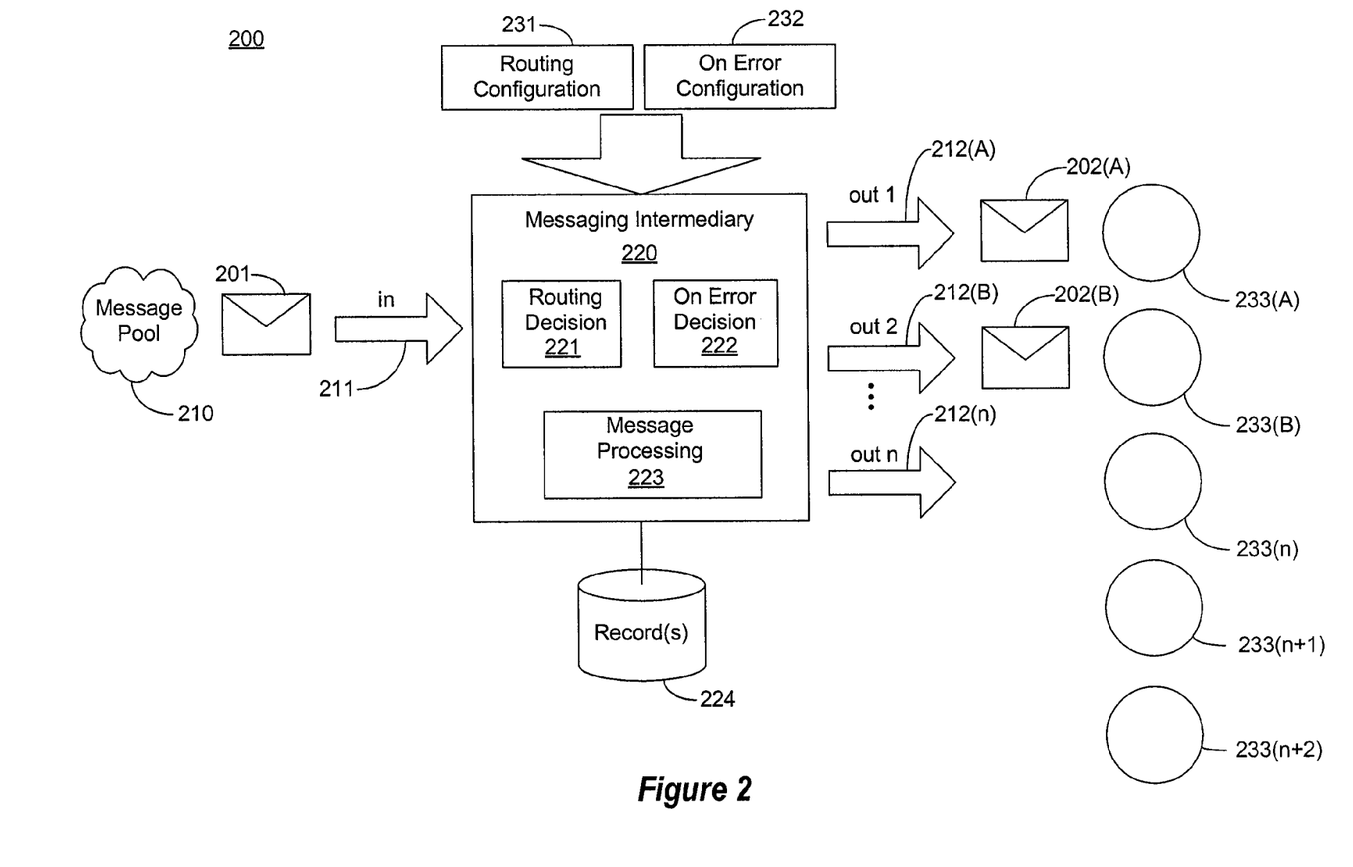
FIG. 2 illustrates a schematic diagram of an intermediary service intermediating message from a message pool to destination message consumers.

FIG. 2 illustrates an architecture 200 in which a messaging intermediary 220 routes messages from a message pool 210 to a number of potential destination message consumers 233. In FIG. 2, there are five destination message consumers 233 (A), 233(B), 233(n), 233(n+1) and 233 (n+2), which are referred to collective as message consumers 233. The message consumers 233 may be any number of message consumers ranging from 2 to an unlimited number. The messages are application-level messages.

The intermediary 220 performs a non-destructive exclusive read of messages from the message pool 210. For instance, the intermediary 220 is illustrated as reading message 201 from the message pool 210 as symbolized by arrow 211. The message pool might be, for example, a message queue. More regarding this non-destructive exclusive read will be described further below.

Upon reading a message, a routing decision module 221 determines which of the destination message consumers 233 to send copies of the message to by using routing rules and applying the routing rules to content examined in the message. In the illustrated embodiment, the routing rules are provided to the messaging intermediary in the form of routing configuration 231. Also in the illustrated case, copies 202(A) and 202(B) of the message 201 are dispatched to destination message consumers 233(A) and 233(B) as symbolized by arrows 212(A) and 212(B). Arrow 212(n) symbolizes that the messaging intermediary 220 may dispatch messages to whichever destination message consumer the routing logic dictates.

The on error decision module 222 handles error handling of messages in the case where the intermediary 220 is not able to send the messages to one or more of the destination message consumers 233. The error handling may be configured by on error configuration 232 and/or by some other error handling logic.

A message processing module 223 handles the actual processing and dispatch of read messages in the case of normal processing. The intermediary 220 also includes a mechanism for recording information illustrated as record(s) 224.

The messaging intermediary 220 and the message consumers 233 may each be implemented by a computing system. While they may all be implemented on a single computing system, the environment 200 might also be distributed with various components implemented on different computing systems. Computing system 100 of FIG. 1 is an example of a computing system that may implement one or more or all of the various components of FIG. 2.

Figure 3:
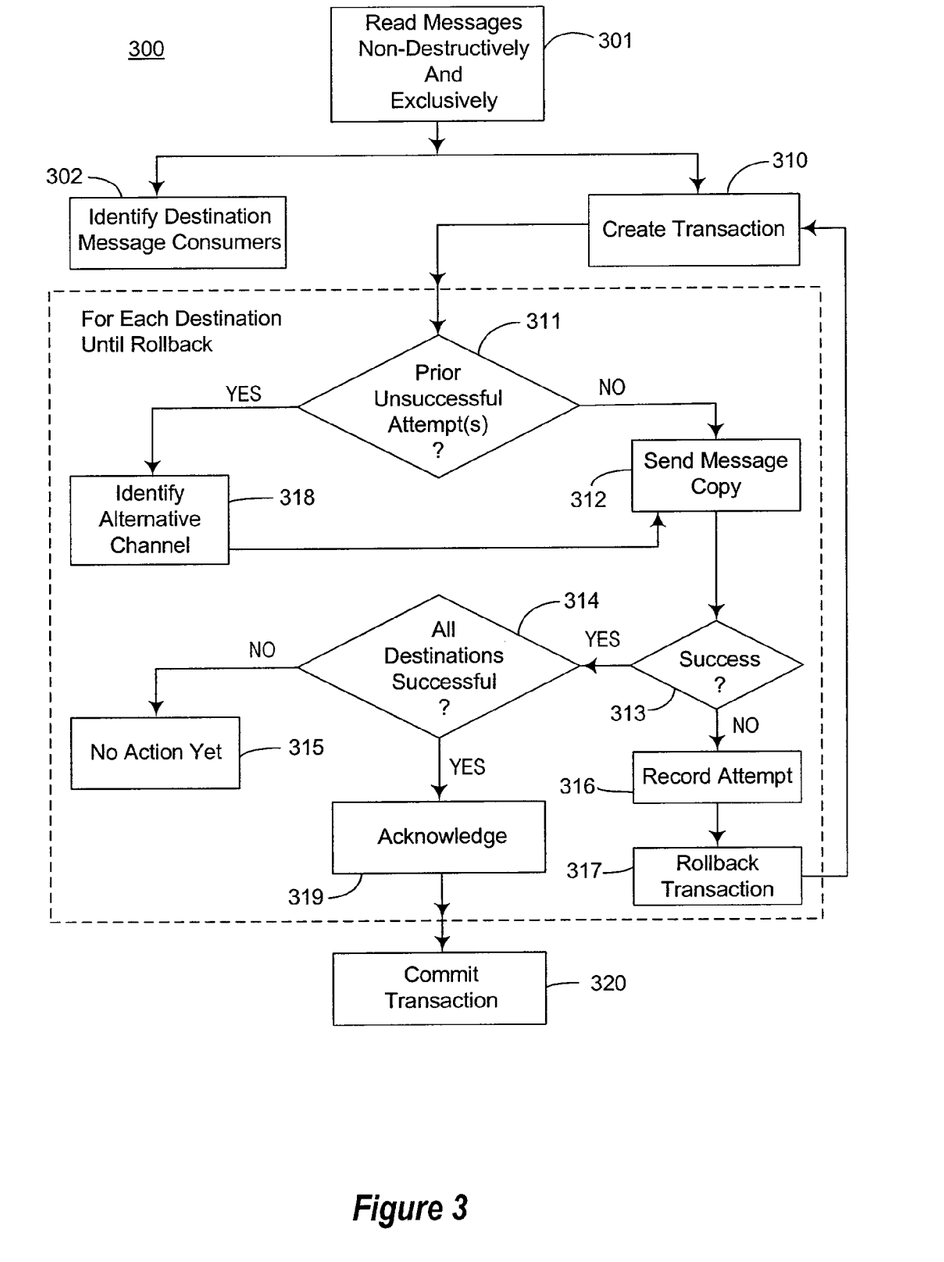
FIG. 3 illustrates a flowchart of a method for intermediating a single message to one of more destination message consumers in a transaction while accounting for error handling.
Figure 4:
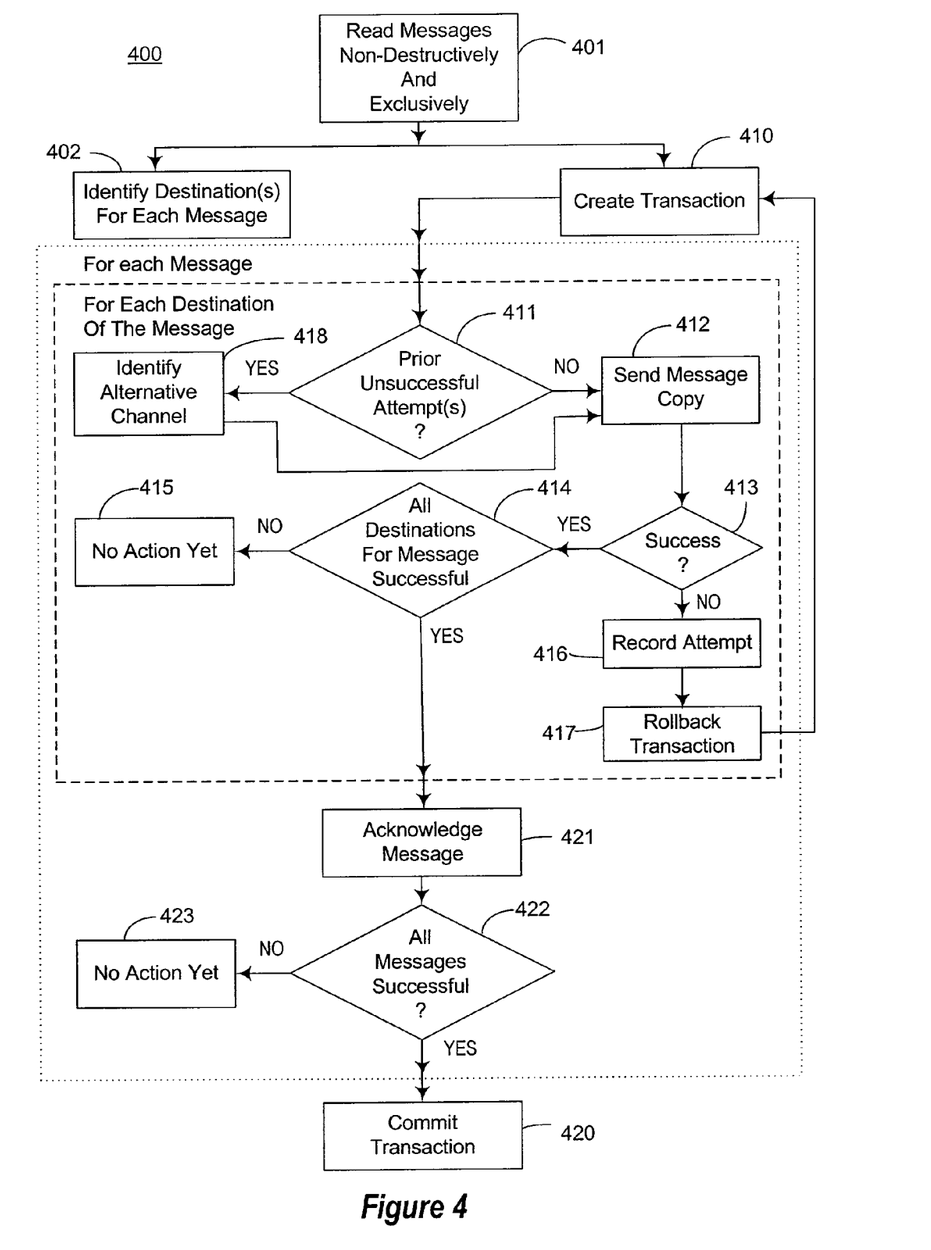
FIG. 4 illustrates a flowchart of a method for intermediating multiple messages to destination message consumers as part of a single transaction while accounting for error handling.

Several methods for intermediating messages between the incoming message pool 210 and the destination message consumers 233 will now be described with respect to FIGS. 3 and 4. The messages are intermediated on a transactional basis. FIG. 3 illustrates a flowchart of a method 300 for intermediating a single message to be handled as part of a transaction. FIG. 4 illustrates a flowchart of a method 400 for intermediating multiple messages to be handled as part of a single transaction. Each intermediation method incorporates error handling in the case of a delivery failure of one or more of the message copies to a corresponding destination message consumer. Of course, the method of FIG. 3 may be performed for multiple messages, and the method of FIG. 4 may be performed for multiple message batches.

Referring to the single message case of FIG. 3, the intermediary reads a message non-destructively and exclusively from the message pool (act 301). As an example, in FIG. 2, the intermediary 220 reads message 201 from the message pool 210. A non-destructive and exclusive read means that a copy of the message is read from the message pool, but the message remains in the message pool (non-destructive), and that the message pool gives the party that read the message exclusive access to the message until the party that read the message releases this exclusivity. Thus, while the intermediary is processing the copy of the message, the message in the message pool itself remains locked and any other entities may not gain access to the locked message. If processing of the message succeeds, the intermediary may acknowledge successful processing, which may result in the message being deleted from the message pool. However, if the processing of the message fails, the intermediary may acknowledge the failed processing which will result in the message remaining in the pool in a state where it is available to be picked up by other processing agents. Alternatively, if the processing by the intermediary should take an excessive amount of time, the lock may expire which again results in the message remaining in the pool available to others.

Once the message is read by the intermediary, the intermediary then identifies one or more destination message consumers that are to be sent the message. For example, in the case of FIG. 2, routing decision module 221 evaluates the content of the message 201 against the routing configuration 231 to determine that copies of the message should be sent to message consumers 233(A) and 233(B). Each destination message consumer is added to a list of destination message consumers that copies of the message are to be sent to. For each destination message consumer in this list, the on error configuration 232 may be used at this point or at some later point to identify one or more alternative channels to dispatch the message to as a substitute in case the message cannot be dispatched normally to the corresponding destination message consumer.

The intermediary also creates a transaction (act 310). Although the identification of the message consumers to which to send a copy of the message may be performed outside of the transaction, they may also be identified inside the transaction. However, since the creation of a transaction may be performed multiple times during the dispatch of a message (as will be described hereinafter), it may be more efficient for the identification of the message consumers to occur outside of the transaction to avoid unnecessary repeating of the identification.

A dashed box is illustrated to contain processing flow that may be repeated for each destination message consumer in the list, at least until processing of one of the destination message consumers causes a rollback of the transaction (see act 317 described further below). The processing occurs after the transaction is created (act 310). For each destination message consumer, the intermediary determines if there had been any prior unsuccessful attempts to send a copy of the message to the corresponding destination message consumer (decision block 311). The intermediary can evaluate this by checking into a super-transactional record to determine if prior unsuccessful attempts have been logged. A "super-transactional record" is simply a record that may be created during the course of a transaction, but which is retained should the transaction be rolled back.

Initially, there will be no record of a prior unsuccessful attempt to send the copy of the message to the corresponding destination message consumer (No in decision block 311). Accordingly, the intermediary attempts to send the copy of the message to the corresponding message consumer under the transaction using a particular transmission channel (act 312). Perhaps this channel is the primary transmission channel used to communicate with the corresponding message consumer.

Subsequently, the intermediary determines whether or not the attempt to send the copy of the message was successful (decision block 313). If it was successful (Yes in decision block 313), but if not all destination message consumers have been successfully sent a copy of the message yet (No in decision block 314), then no decision is yet made regarding committing or rolling back the transaction (act 315). If the send of the copy of the message was successful (Yes in decision block 313), and this success finalizes successful sending of copies of the message to all identified destination message consumers that were to be sent the copy (Yes in decision block 314), then the transaction may be committed (act 320) unless some further processing is desired to be included under the same transaction.

On the other hand, if the attempt to send the copy of the message is not successful (No in decision block 313), the intermediary records sufficient information from which can be read or inferred that the attempt to send the copy of the message to the corresponding destination computing system over the particular channel failed (act 316). Then, the transaction is rolled back (317). There are several important things to note regarding this rolling back. First, even though the recording of the failed attempt was recorded during the course of the transaction (act 316), the rolling back does not destroy that record, hence the term "super-transactional" record. Second, the rolling back of the transaction rolls back the effect of prior transmission attempts, even for those attempts that had been successful. Thus, it is very possible for processing to have proceeded to decision block 314 for multiple send attempts, but a rollback of the transaction for another transmission attempt would cause all of that process to be rolled back. Third, the rolling back of the transaction does not unlock the message in the message pool. It is because this lock is retained along with the "super transactional" record that the intermediary is able to reattempt multiple processing iterations.

After a rollback has occurred (act 317), whether after the first transaction or whether after any subsequent transaction, the intermediary again creates a transaction. In a subsequent transaction, there may be one or more records of failed attempts to send to destination message consumers. Zero or more destination message consumers may have zero such records associated therewith, but one or more other destination message consumers would have one or more such records. In FIG. 2, for example, such records may be kept as part of records 224.

In this subsequent transaction, if there has not been any unsuccessful prior attempts to send the copy of the message to the corresponding destination message consumer, processing proceeds to act 312 where the process is repeated as described above. However, for any particular destination message consumer, it is very possible that there have been prior unsuccessful attempts identified in the records (Yes in decision block 311). In this case, an alternative channel is identified to send the copy of the message over in lieu of sending the copy of the message to the corresponding destination message consumer over the prior attempted transmission channel (act 318). This alternative channel may be identified using internal logic and/or on error configuration information. For example, in FIG. 2, the on error decision module 222 may use on error configuration 232 to identify the alternative transmission channel. The alternative transmission channel might involve a different transmission mechanism to send to the same destination message consumer, a different transmission mechanism to send to a different destination message consumer, or the same transmission mechanism used to send to a different destination message consumer. The different destination message consumer might even be a logging service, a dead letter queue, or any other destination that records failed delivery attempts.

The intermediary then attempts to send the copy of the message over the alternative transmission channel (act 312). Once again, if that send is successful (Yes in decision block 313), processing proceeds in the manner previously described. If that send is unsuccessful (No in decision block 313), the attempt is recorded (act 316) so that the failed attempt can be further considered when evaluating a yet further alternative channel (act 318) to send the copy of the message over in lieu of sending to the corresponding destination computing system over the first-attempted transmission channel. Then, once again, the transaction would be rolled back (act 317).

Ultimately, as long as the primary or one of the alternative transmission channels was successful for each destination message consumer that was identified to be sent a copy of the message, the message is acknowledged (act 319) and the transaction is committed (act 320). Since alternative message channels are attempted, it is much more likely that the message will be successfully dispatched by the intermediary. However, there might still be a chance that for one or more of the identified destination message consumers that are to be sent a copy of the message, that none of the primary nor the one or more alternative channels will be successful. In this case, in act 318, the intermediary would be unable to identify any alternative channels for the corresponding destination message consumer. In that case, the intermediary may acknowledge a failed processing of the message to the message pool, allowing the message pool to release the exclusivity lock on the message, and allowing other entities to access the message from the message pool. However, since this event is much less likely than in conventional intermediaries, this processing is not illustrated in the method 300 of FIG. 3, nor in the method 400 of FIG. 4.

Referring to the multiple message batch case of FIG. 4, the intermediary reads not just the one message, but reads all of the messages that are to be handled as part of a single transaction from the message pool (act 401). Once again, this reading occurs non-destructively and exclusively resulting in a lock of the messages in the message pool. The routing of each of the message is also determined (act 402), which may occur in the same manner as described for act 302 of FIG. 3, except performed for multiple messages. The result will be a list of messages, and for each message in the list of messages, a list of destination message consumer(s) to be sent a copy of the message.

The intermediary creates a transaction (act 410). In this case, a dotted box (the exterior box) is used to show processing that occurs for each message that is to be treated under the single transaction, and the dashed box (the nested internal box) is used to show processing that occurs for each destination message consumer to be sent the copy of the corresponding message. Note that the identity of the destination message consumers need not be the same, and in many cases would not be the same, for each message to be processed under the transaction.

For each message, and for each destination message consumer corresponding to that message, the intermediary determines if there had been any prior unsuccessful attempts to send a copy of the corresponding message to the corresponding destination message consumer (decision block 411). Once again, the intermediary can evaluate this by checking into super-transactional record(s) to determine if prior unsuccessful attempts have been logged.

Initially, there will be no record of a prior unsuccessful attempt to send the copy of the message to the corresponding destination message consumer (No in decision block 411). Accordingly, the intermediary attempts to send the copy of the corresponding message to the corresponding message consumer under the transaction using a particular transmission channel (act 412).

Subsequently, the intermediary determines whether or not the attempt to send the copy of the corresponding message was successful (decision block 413). If it was successful (Yes in decision block 413), but if not all destination message consumers have been successfully sent a copy of the corresponding message yet (No in decision block 414), then no decision is yet made regarding committing or rolling back the transaction (act 415). If the send of the copy of the message was successful (Yes in decision block 413), and this success finalizes successful sending of copies of the corresponding message to all identified destination message consumers that were to be sent the copy (Yes in decision block 414), then the intermediary acknowledges successful processing of the message to the message pool under the transaction (act 421). This would cause the message pool to delete the message under the transaction. If not all messages in the batch have yet been successfully processed in this way (No in decision block 422), then no decision is yet taken regarding committing or rolling back the transaction (act 423).

Recall that after successful processing of a message in the batch, the successful processing is acknowledged to the message pool, causing the message pool to perhaps delete the message. This acknowledge and deletion are performed under the transaction. If, at any point, the transaction is rolled back, the delete of the message would also be rolled back, causing the message to be restored to the message pool in the same condition it was in at the time the transaction was created (i.e., being locked for exclusive access by the intermediary, and awaiting acknowledgement).

On the other hand, returning to decision block 413 to evaluate an alternative processing path, if the attempt to send the copy of the corresponding message is not successful (No in decision block 413), the intermediary records sufficient information from which can be read or inferred that the attempt to send the copy of the message to the corresponding destination computing system over the particular channel failed (act 416). Then, the transaction is rolled back (417). Such a rolling back will not destroy any records of prior failed attempts to send.

After a rollback has occurred (act 417), whether after the first transaction or whether after any subsequent transaction, the intermediary again creates a transaction (act 410). In a subsequent transaction, there may be one or more records of failed attempts to send to destination message consumers. In this subsequent transaction, for any particular destination message consumer, it is very possible that there have been prior unsuccessful attempts identified in the records (Yes in decision block 411). In one embodiment that may be more efficient, each message in the transaction is treated in isolation when considering failed attempts. Yet another alternative embodiment affinitizes the record with the transmission channel rather than a message. Under that alternative embodiment, a first message in the batch may have a failed attempt transmitting to message consumer A. Later, a second message in the batch may also be preparing to transmit to message consumer A. When the record is affinitized with the transmission channel, an alternative transmission channel will be used to transmit the second message to message consumer A even though there was never a previous attempt to transmit the second message. In any case, in the case of a prior failed attempt to send a message over a particular channel, an alternative channel is identified to send the copy of the corresponding message over in lieu of sending the copy of the corresponding message to the corresponding destination message consumer over the prior attempted transmission channel (act 418). This may be done in the same manner as described for act 318 of FIG. 3.

The intermediary then attempts to send the copy of the corresponding message over the alternative transmission channel (act 412). Once again, if that send is successful (Yes in decision block 413), processing proceeds in the manner previously described. If that send is unsuccessful (No in decision block 413), the attempt is recorded (act 416) so that the failed attempt can be further considered when evaluating a yet further alternative channel to send the copy of the message over in lieu of sending to the corresponding destination computing system over the first-attempted transmission channel. Then, once again, the transaction would be rolled back (act 417).

Ultimately, as long as the primary or one of the alternative transmission channels was successful for each destination message consumer that was identified to be sent a copy of the corresponding message, and for each of the messages that are to be processed as part of the batch, the transaction is committed (act 420). Once again, since alternative message channels are attempted, it is much more likely that the message will be successfully dispatched by the intermediary. However, there might still be a chance that for any given one of the messages, and for one or more of the identified destination message consumers that are to be sent a copy of the correspond message, that none of the primary nor the one or more alternative channels will be successful. In this case, in act 418, the intermediary would be unable to identify any alternative channels for the corresponding destination message consumer. In that case, the intermediary may simply roll back the transaction or indicated a failure acknowledgement to the message pool for all messages in the batch. This would release in the message pool the message batch for further processing.

The embodiments described herein improve on the conventional error handling of intermediaries. Each time a transaction is attempted, the intermediary learns more about what channels are successful and which fail. The intermediary takes this information learned from prior transaction attempts, and applies that knowledge to subsequent attempts. Thus, as long as the primary or alternative channels works for each attempt to be made under the transaction, the transaction will succeed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a computer-implemented intermediary service to distribute incoming messages from an incoming pool of application-level messages to a plurality of message consumers while incorporating error handling in case of a delivery failure on a message by message basis, the method comprising:

an act of performing a non-destructive exclusive read of a message from an incoming pool of application-level messages;

an act of identifying one or more message consumers to be sent the read message;

an act of creating a first transaction;

an act of executing a first attempt to send the message to a first message consumer using a first transmission channel under the first transaction;

an act of detecting that the first attempt failed to send the message to the first message consumer using the first transmission channel under the first transaction;

an act of creating a first record recording that the first attempt failed;

an act of rolling back the first transaction while retaining the first record;

an act of creating a second transaction to send the message to the one or more message consumers;

subsequent to the first transaction being rolled back, an act of creating a second transaction for sending the message to the one or more message consumers;

prior to attempting to send the message to the one or more message consumers using the second transaction, an act of accessing the first record as part of the second transaction to determine whether there have been any previous failed attempts to send the message to any of the one or more message consumers during one or more previous transactions; and thereafter, if it is determined that the first record fails to indicate that there has been at least one previous failed attempt to send the message to any particular consumer during a previous transaction, an act of executing a second attempt to send the message to the particular consumer using a same channel under the second transaction that was previously used to send the message to the particular consumer, and when it is determined that the first record indicates that there has been at least one previous failed attempt to send the message to the first message consumer during a previous transaction, an act of executing a second attempt to send the message to the first consumer using a second transmission channel under the second transaction.

2. A method in accordance with claim 1, wherein the second transmission channel comprises a different transmission mechanism used to send the message to the first message consumer.

3. A method in accordance with claim 1, wherein the second transmission channel comprise a transmission mechanism used to send the message to a different message consumer.

4. A method in accordance with claim 3, wherein the different message consumer is a destination that records failed delivery attempts.

5. A method in accordance with claim 1, wherein the act of identifying at least a first message consumer that is to be sent the read message comprises an act of identifying at least the first message consumer and a second message consumer that is to be sent the read message, the method further comprising:
   an act of executing an attempt to send the message to the second message consumer under the first transaction; and
   an act of detecting that the attempt succeeded to send the message to the second message consumer under the first transaction, wherein the act of rolling back occurs despite the attempt to send the message to the second message consumer succeeding.

6. A method in accordance with claim 1, wherein the message is a first message, wherein after the first transaction was rolled back, performing the following:
   an act of performing a non-destructive exclusive read of a second message from the incoming pool of application-level messages;
   an act of identifying that the second message is to be sent to the first message consumer;
   upon using the first record to determine that a prior attempt to send to the first message consumer failed, an act of identifying a second transmission channel to dispatch the second message to in lieu of sending the second message to the first message consumer using the first transmission channel; and
   an act of executing a first attempt to send the second message using the second transmission channel under the second transaction without first attempting to send the second message using the first message consumer.

7. A method in accordance with claim 1, further comprising:
   an act of detecting that the second attempt failed to send the message using the second transmission channel under the second transaction;
   an act of creating a second record recording that the second attempt failed;
   an act of rolling back the second transaction while retaining the second record;
   an act of creating a third transaction;
   after the second transaction was rolled back, an act of accessing the second record;
   an act of identifying a third transmission channel to dispatch the message to in lieu of sending the message using the second transmission channel that was attempted in lieu of sending the message using the first transmission channel to the first message consumer; and
   an act of reattempting to send the message using the third transmission channel under the second transaction.

8. A method in accordance with claim 1, wherein the act of identifying at least a first message consumer that is to be sent the read message comprises an act of identifying at least the first message consumer and a second message consumer that is to be sent the read message, the method further comprising:
   an act of determining that the message was successfully sent using a particular transmission channel and under a particular transaction in lieu of sending the message to the first message consumer using the first transmission channel; and
   an act of executing an attempt to send the message to the second message consumer under the particular transaction.

9. A method in accordance with claim 8, wherein the particular transaction is the second transaction or a subsequent transaction.

10. A method in accordance with claim 1, wherein the second attempt succeeds, the method further comprising:
    an act of committing the second transaction.

11. The method recited in claim 1, wherein the intermediary service performs the non-destructive exclusive read, and wherein the method further includes the intermediary service taking out an exclusive lock on the message without removing the message from a sent message queue during non-destructive exclusive read, the exclusive lock remaining on the message, even during rollback of the first transaction, and such that the intermediary service retains the same exclusive lock on the message through the second transaction without having to take out a new lock on the message for the second transaction.

12. A storage device having thereon stored computer-executable instructions that are structured such that, when executed by one or more processors of a computing system, cause the computing system to perform a method for a computer-implemented intermediary service to distribute incoming messages from an incoming pool of application-level messages to a plurality of message consumers while incorporating error handling in case of a delivery failure, the method comprising:
   an act of performing a non-destructive exclusive read of a plurality of messages from an incoming pool of application-level messages, the plurality of messages to be processed transactionally as a whole;
   for each of the plurality of messages, identifying one or more corresponding destination messages consumers to be sent the corresponding message;
   an act of creating a first transaction;
   an act of beginning to execute a first attempt under the first transaction to send the plurality of messages to each of their one or more corresponding destination message consumers;
   an act of detecting that at least one of the plurality of messages failed to be delivered to at least one of its corresponding one or more destination message consumers;
   an act of creating a first record recording that the first attempt failed, the recording specifying at least that a first particular message was not able to be sent to a particular destination message consumer using a particular transmission channel that was attempted under the first transaction;
   in response to the act of detecting, an act of rolling back the first transaction while retaining the first record;
   subsequent to the first transaction being rolled back, an act of creating a second transaction to send the plurality of messages to the one or more destination message consumers;
   prior to attempting to send each of the plurality of messages to their one or more corresponding destination message consumers, an act of accessing the first record to determine whether there have been any previous failed attempts to send each of the plurality of messages to their corresponding destination message consumers during one or more previous transactions;
   upon determining that the first record fails to indicate that there has been at least one previous failed attempt to send a second particular message to its corresponding destination message consumer during a previous transaction, an act of executing a second attempt to send said second particular message to its corresponding destination message consumer using the first transmission channel under the second transaction; and upon determining that the first record indicates that there has been at least one previous failed attempt to send the first particular message to the particular destination message consumer during a previous transaction, an act of executing a second attempt to send the message to the particular destination message consumer using a second transmission channel under the second transaction.

13. The storage device in accordance with claim 12, wherein the set of one or more destination message consumers is different for at least some of the plurality of messages.

14. The storage device in accordance with claim 12, wherein the set of one or more destination message consumers is multiple destination message consumers for at least some of the plurality of messages.

15. The storage device in accordance with claim 12, wherein as part of the execution of the first attempt under the first transaction to send the plurality of messages to each of their one or more corresponding destination message consumers, a subset of the plurality of messages were successfully sent to all of their corresponding one or more destination message consumers, wherein the method further comprising the following for each of the subset of the plurality of messages:

an act of acknowledging successful processing of each of the subset of the plurality of the messages under the first transaction, whereupon the act of rolling back the first transaction rolls back the successful sending of the subset of the message to their corresponding one or more destination message consumers, and also rolls back the acknowledgement of successful processing of each of the subset of the plurality of the messages.

16. The storage device in accordance with claim 12, wherein the act of rolling back the first transaction while retaining the first record occurs before all of the plurality of messages are attempted to be sent.

17. The storage device in accordance with claim 12, wherein during execution of the second attempt, if it is determined that at least one of the messages failed to be delivered to the one or more corresponding destination message consumers, the method further comprises:

an act of creating a second record recording that the second attempt failed, and an act of rolling back the second transaction while retaining the first record;

an act of creating a third transaction; and an act of beginning to execute a third attempt under the third transaction to send the plurality of messages to each of their one or more corresponding destination message consumer, the second record used to identify an alternative transmission channel for the message and corresponding destination message consume whose delivery failed in the second transaction.

18. The storage device in accordance with claim 12, wherein if an attempt to send the plurality of messages to their corresponding set of one or more destination message consumers succeeds for all of the plurality of messages during a particular transaction, the method further comprises an act of committing the particular transaction.

19. A method for a computer-implemented intermediary service to distribute incoming messages from an incoming pool of application-level messages to a plurality of message consumers while incorporating error handling in case of a delivery failure, the method comprising:

an act of performing a non-destructive exclusive read of a message from an incoming pool of application-level messages;

an act of identifying a group of one or more message consumers that are to be sent the read message;

an act of creating a first transaction;

for each of at least one of the one or more message consumers in the group of message consumers that are to be sent the message, performing the following:

an act of attempting to send the message to the corresponding message consumer using a first transmission channel under the first transaction;

an act of detecting that the attempt to send the message using the first transmission channel under the first transaction failed;

an act of super-transactionally recording that the attempt failed to deliver the message using the first transmission channel to the corresponding message consumer under the first transaction;

an act of rolling back the first transaction while retaining the super-transactional recording corresponding to the at least one of the one or more message consumers;

an act of creating a second transaction;

for each of at least one of each of the one or more message consumers in the group of message consumers that are to be sent the message, performing the following:

an act of accessing the corresponding super-transactional record indicating that the attempt to send the message using the first transmission channel to the corresponding message consumer under the first transaction failed;

an act of identifying an alternative message consumer to dispatch the message to in lieu of sending the message to the corresponding message consumer; and an act of attempting to send the message to the alternative message consumer, the alternative message consumer comprising a destination that records failed delivery attempts.

* * * * *